US007153077B2

(12) United States Patent
Warner

(10) Patent No.: US 7,153,077 B2
(45) Date of Patent: Dec. 26, 2006

(54) INCREASING RAILCAR CAPACITY WITH AUGER

(76) Inventor: Lee Arlington Warner, 6217 Pentridge Ct., Raleigh, NC (US) 27614

( * ) Notice: Subject to any disclaimer, the term of this patent is extended or adjusted under 35 U.S.C. 154(b) by 186 days.

(21) Appl. No.: 10/651,656

(22) Filed: Aug. 28, 2003

(65) Prior Publication Data

US 2005/0063805 A1 Mar. 24, 2005

(51) Int. Cl.
*B65G 67/00* (2006.01)

(52) U.S. Cl. ...................................... 414/398; 414/373

(58) Field of Classification Search ................ 414/339, 414/373, 398

See application file for complete search history.

(56) References Cited

U.S. PATENT DOCUMENTS

| | | | | |
|---|---|---|---|---|
| 3,452,885 | A * | 7/1969 | Mahlon | 414/345 |
| 3,722,715 | A * | 3/1973 | Young | 414/292 |
| 3,866,769 | A * | 2/1975 | Morey et al. | 406/44 |
| 3,872,784 | A * | 3/1975 | Kaszuba et al. | 100/45 |
| 3,877,589 | A * | 4/1975 | Stockman | 414/198 |
| 4,227,849 | A * | 10/1980 | Worthington | 414/408 |
| 4,567,820 | A * | 2/1986 | Munsell | 100/65 |
| 4,666,033 | A * | 5/1987 | Reid | 198/664 |
| 4,888,940 | A * | 12/1989 | Deutsch | 56/16.6 |
| 6,283,275 | B1 * | 9/2001 | Morris et al. | 198/677 |
| 6,312,206 | B1 | 11/2001 | Pylate et al. | |
| 6,312,207 | B1 * | 11/2001 | Rautiainen | 414/398 |

* cited by examiner

*Primary Examiner*—Joe Dillon, Jr.
(74) *Attorney, Agent, or Firm*—Coats & Bennett, P.L.L.C.

(57) ABSTRACT

In an embodiment, a device for increasing railcar capacity is disclosed. The device includes one or more augers that transfer and pack bulk materials into a railcar. In an embodiment, the one or more augers are compression augers. In another embodiment, the device includes two augers where one auger is a left-hand auger and the other auger is a right-hand auger. The left-hand auger and right-hand auger are mounted on a common shaft. The forces on the device arising from packing the railcar and compression of bulk materials by the one or more augers are offset by the common shaft. In an embodiment, one or more feeds supply bulk materials to the one or more augers. In another embodiment, the one or more feeds are feed augers. In another embodiment, the one or more feeds are feed belts. In another embodiment, the one or more feeds are feed drags. In another embodiment of the device provided, the one or more feeds transfer and pack bulk materials into a railcar.

12 Claims, 5 Drawing Sheets

INCREASING RAILCAR CAPACITY WITH AUGER

FIELD OF THE INVENTION

This application relates generally to loading of railcars, and, more particularly, to packing bulk materials into a railcar via an auger in order to increase railcar capacity.

BACKGROUND OF THE INVENTION

Augers are commonly used to convey materials in industrial applications. Applications for augers are as varied as forcing molten materials through an extruder, or filling a container with solids for transport. Unsurprisingly, auger designs may vary considerably depending on the application. FIGS. 1, 2, 3, and 4 illustrate four examples of different auger designs and highlight some of the variety of auger features that may be manipulated. In FIG. 1, auger flights 5 are configured such that when the auger shaft 8 is rotated, the rotating action of the flights 5 resembles that of the threads of a screw, which is what pushes material along the length of the shaft 8. The distance between corresponding points on consecutive flights 5 is typically called the pitch 10, which may vary along the length of the auger, depending on the application. Several auger features may be tailored to transfer different types of materials in different applications; such features include radius 12, which is the distance 12 from the center of the shaft 8 to the edge of a flight 5, pitch 10, and the existence of openings 14 in the flights 5. The ratio of pitch to diameter may be considered, depending on, for example, whether materials are only conveyed, or conveyed and mixed, or conveyed and packed/compressed. FIG. 2 is another example of an auger, which does not have openings in the flights 20. Typically, the amount of material to be moved per unit time determines the diameter of the auger; a larger radius generally moves more material. FIG. 3 illustrates an example of two augers 30, 40 housed in the same trough 45, where the flights 42 do not have openings, but instead include cuts 44. The cut depth 46 is the flight height 41 minus the distance from the outer surface of the shaft 48 to the bottom 43 of the cut 44. Housing augers in a trough 45 is common. The clearance between the trough 45 and the auger flights 42 may vary depending on the type of material conveyed. FIG. 4 is an example of an auger including flights 74*a*, 74*b*, 74*c* that have cuts 70 and folds 72. Cut flights are generally employed when the pitch is less than the diameter of the auger. The cuts may reduce the tendency of the material conveyed with such a design to compress between the flights rather than be pushed along by the auger. Auger characteristics such as pitch, flight height, trough clearance, and the existence, size, and shape of any openings, cuts, and folds in the flights may depend on the type of material processed and whether things such as mixing, agitation, and pressure/packing/compression at an outlet (e.g., in an extrusion application) are desired.

Significant costs are incurred because of the need to transport goods across the United States and internationally via truck, rail, air, and ship. Beneath certain maximum weight limits, the costs of transportation are often calculated per unit volume, or per container, rather than per unit weight. For example, when transporting via train, the cost may be calculated per railcar, as long as the weight of the goods in a single railcar stays beneath a certain maximum. Thus, there is a great cost incentive for transporters of goods to maximize the use of space when transporting. Further, even small per unit volume or per container cost savings may be significant because the total volume of goods transported is often large enough to bring about huge overall savings.

Thus, it would be desirable to have an improved method of loading bulk materials into a railcar that maximizes railcar capacity by increasing the density of materials within the railcar and, therefore, reduces transportation costs.

SUMMARY OF THE INVENTION

In an embodiment, a device for increasing railcar capacity is disclosed. The device includes one or more augers that transfer and pack bulk materials into a railcar. In an embodiment, the one or more augers are compression augers. In another embodiment, the device includes two augers where one auger is a left-hand auger and the other auger is a right-hand auger. The left-hand auger and right-hand auger are mounted on a common shaft. The forces on the device arising from packing the railcar and compression of bulk materials by the one or more augers are offset by the common shaft. In an embodiment, one or more feeds supply bulk materials to the one or more augers. In another embodiment, the one or more feeds are feed augers. In another embodiment, the one or more feeds are feed belts. In another embodiment, the one or more feeds are feed drags. In another embodiment of the device provided, the one or more feeds transfer and pack bulk materials into a railcar.

In an embodiment, the one or more augers provided possess a ratio of auger pitch to auger diameter from about 0.05 to about 0.5. In another embodiment, the one or more augers provided include cut flights except for the last flight at the discharge end of the one or more augers. In another embodiment, the device provided packs a railcar with at least about 62 tons of bulk materials. In another embodiment, the device provided packs a railcar with at least about 75 tons of bulk materials. In another embodiment, the device provided packs a railcar with at least about 95 tones of bulk materials. In another embodiment, the device provided increases railcar capacity from about 0 to about 100 weight percent.

In an embodiment, a method is provided including supplying bulk materials to one or more augers and transferring the bulk materials via the one or more augers into a railcar. The one or more augers increase railcar capacity by packing and compressing the bulk materials in the railcar.

In an embodiment, a system for increasing railcar capacity is provided. The system includes one or more augers that transfer and pack bulk materials into a railcar, one or more feeds that supply bulk materials to the one or more augers, one or more receptacles for receiving bulk materials and making the bulk materials available to the one or more feeds, a mechanism for moving the one or more augers into and out of a railcar, and a base that allows the system to be transported and anchored.

In an embodiment, an apparatus that conveys and packs bulk materials into a container is provided. The apparatus includes a left-hand auger and a right-hand auger that share a common shaft. The apparatus is positioned inside a container such that the left-hand auger packs one half of the container and the right-hand auger packs the opposite half of the container. In an embodiment, the flight angle of the left-hand auger and right-hand auger is selected to minimize risk to container integrity. In another embodiment, the timing and alignment of the left-hand auger and right-hand auger are equal. In another embodiment, the apparatus packs bulk materials into a container such that they are compressed in the container. In another embodiment, the apparatus is designed and operated such that a substantial percentage of the forces on the apparatus resulting from compression of bulk materials are directed along and thereby offset by the common shaft. The offset maintains the stability of the apparatus in the container.

DETAILED DESCRIPTION OF EMBODIMENTS

Figure 1:
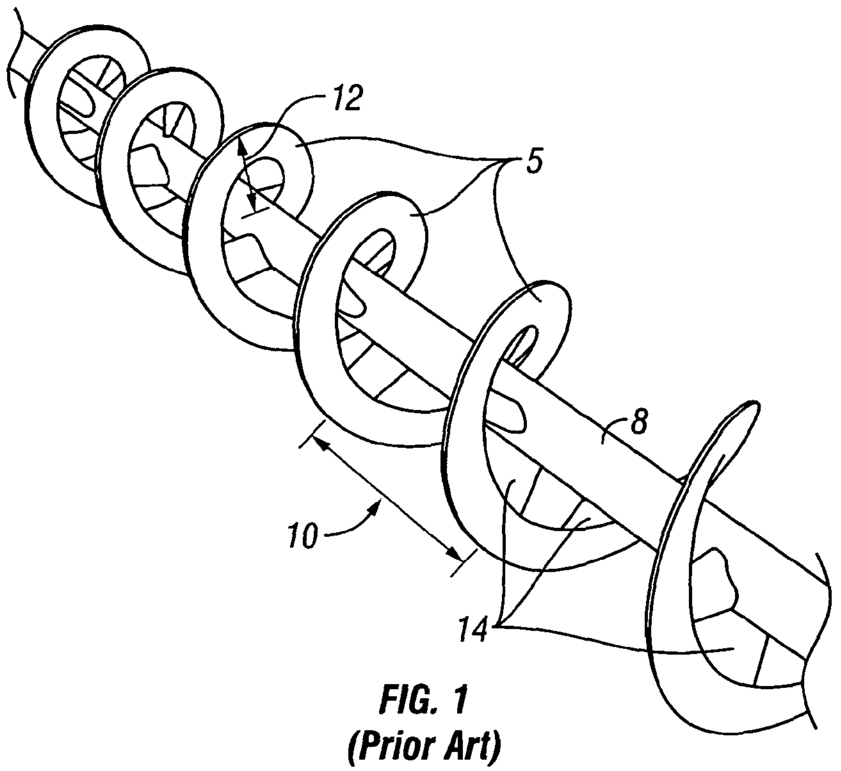
FIG. 1 (Prior Art)
FIG. 1 illustrates a perspective view of an embodiment of an auger of the prior art.
Figure 2:
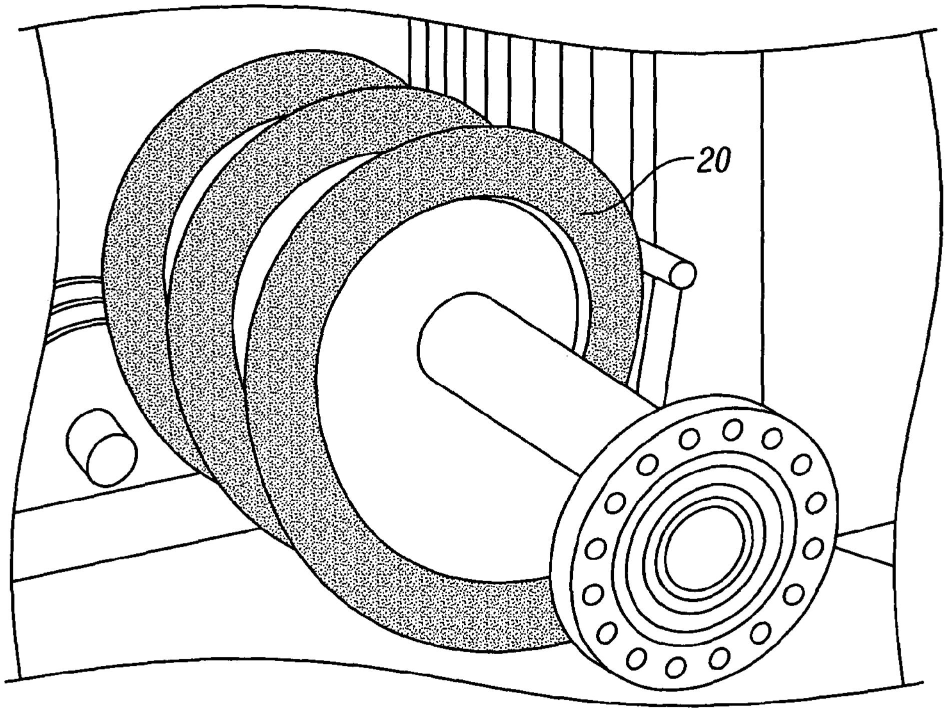
FIG. 2 (Prior Art)
FIG. 2 illustrates a perspective view of an embodiment of an auger of the prior art.
Figure 3:
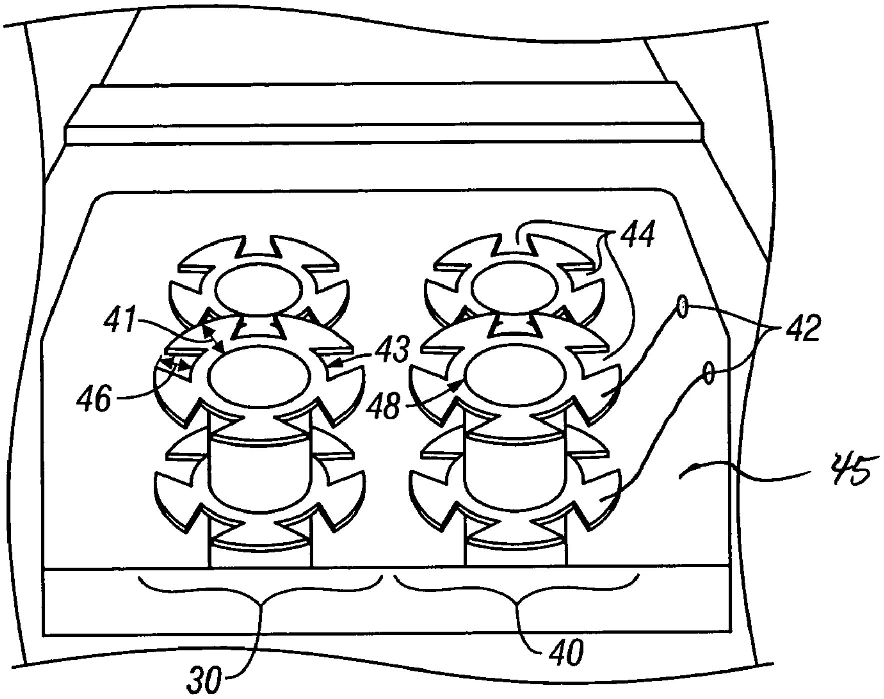
FIG. 3 (Prior Art)
FIG. 3 illustrates a perspective view of an embodiment of an auger of the prior art.
Figure 4:
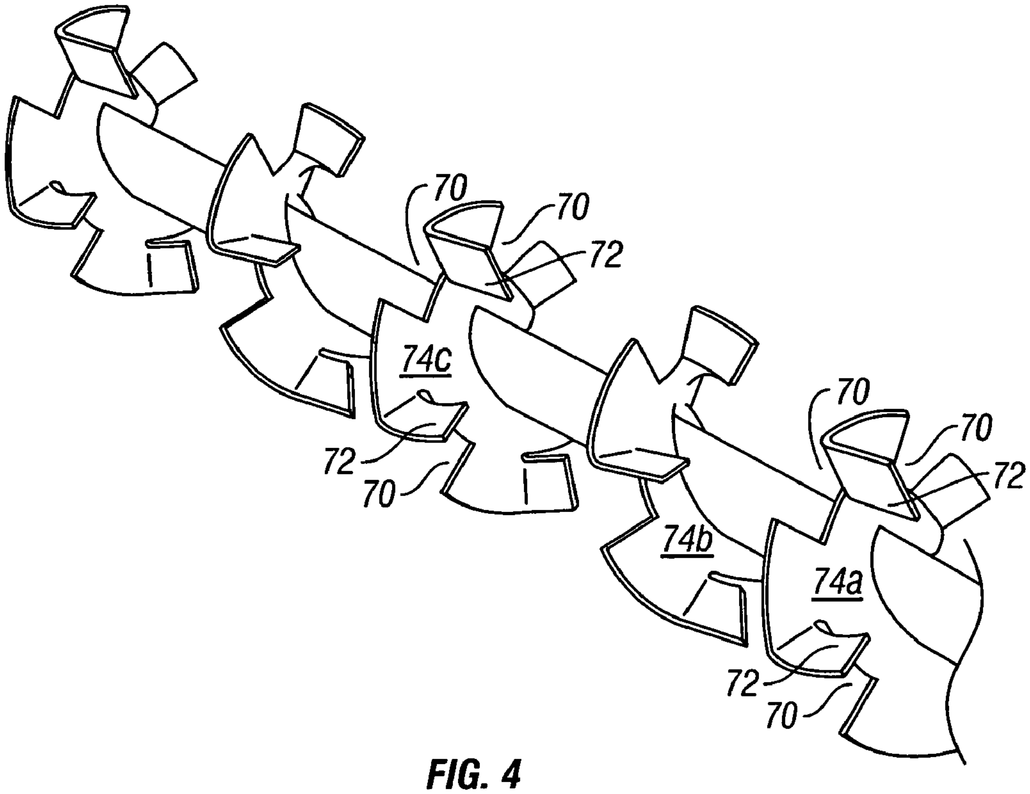
FIG. 4 (Prior Art)
FIG. 4 illustrates a perspective view of an embodiment of an auger of the prior art.
Figure 5:
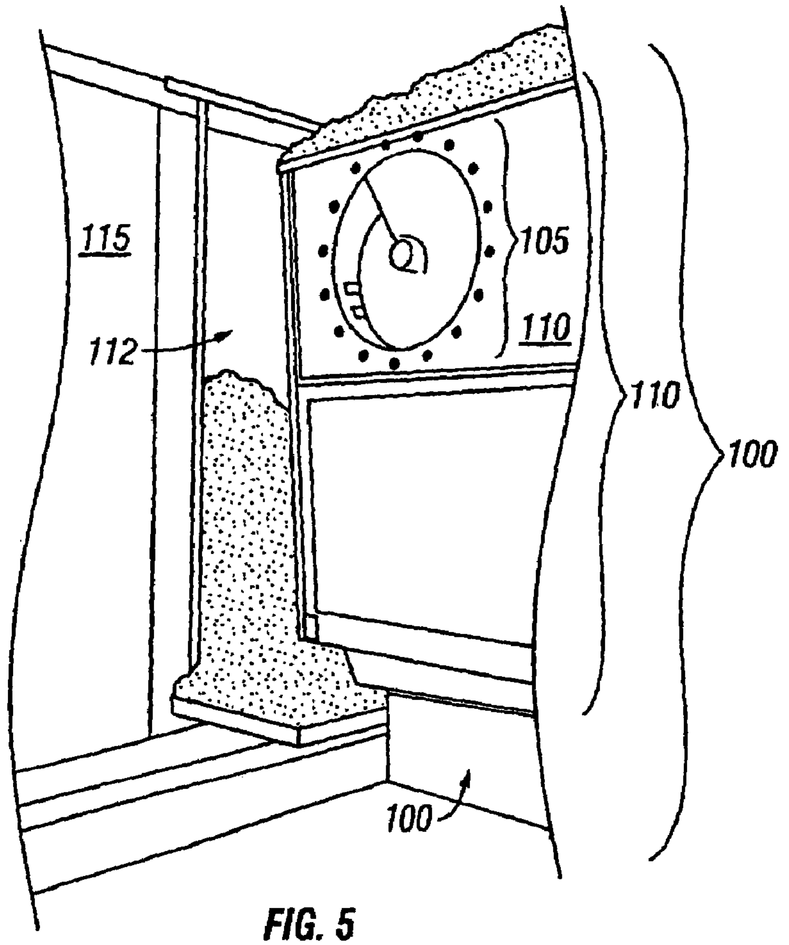
FIG. 5 illustrates a perspective view of an embodiment of an auger device for increasing railcar capacity.

In an embodiment illustrated by a side view in FIG. 5, a device 100 for increasing railcar capacity is provided. One or more augers 105 are a part of an assembly 110. In this embodiment, the assembly 110 is positioned outside the opening 112 of a railcar 115. The assembly 110 is sized to fit into the opening 112 so that the auger 105 may be moved inside the railcar 115. Once the assembly 110 is positioned inside the railcar 115, bulk materials may be supplied to the auger 105, which transfers the bulk materials into the railcar 115.

As the device 100 transfers bulk materials into the railcar 115, the space not occupied by the assembly 110 fills with bulk materials. As the available space (not occupied by the assembly 110) inside the railcar 115 fills, the density of the bulk materials in the railcar 115 increases. The auger 105 continues to transfer bulk materials into the railcar 115 and increase material density in the railcar 115. In an embodiment, as the railcar 115 fills and the density of materials inside the railcar 115 increases, the auger 105 not only loosely transfers materials into the railcar 115, but also packs and/or compresses the materials in the railcar so that the density in the railcar 115 continues to increase.

In an embodiment, the auger 105 is a compression auger. A compression auger 105 may be designed to not only convey materials into a railcar (or other confined space, such as, for example, another type of container or extrusion apparatus), but also, as the railcar becomes full, to continue to push or pack materials into the railcar, which compresses the materials, thus increasing material density. In various embodiments, as described in the present application, the ability to pack/compress bulk materials into a confined space by employing a compression auger may be applied to packing of railcars 115 to maximize railcar 115 capacity.

The pitch between flights of an auger may impact an auger's ability to push, press, and compress materials in a container. Augers designed to convey materials may typically have a pitch that is near or equal to the auger diameter. In some applications, auger pitch may be less than auger diameter. In general, as pitch-to-diameter ratio falls below unity, the auger's ability to push and press materials into a confined space increases. In an embodiment of the device provided herein, the auger includes a pitch that is not greater than the auger diameter. In another embodiment, the ratio of auger pitch to auger diameter is from about 0.05 to about 0.5. In another embodiment, the ratio of auger pitch to auger diameter is from about 0.1 to about 0.3. In another embodiment, the ratio of auger pitch to auger diameter is from about 0.15 to about 0.25.

The flights of the auger presented may also include cuts. In general, especially with augers having a pitch that is smaller than the auger diameter, cuts promote the conveyance of materials down the auger. Otherwise, especially in applications where pitch is smaller than diameter, materials would not be transferred as efficiently down the auger, but rather would tend to be collected, trapped, and compressed between flights. In an embodiment, the auger flights are cut except for the last flight at the discharge end of the auger.

The railcars provided herein are typical boxcars commonly used in shipping via rail. Such railcars typically vary from about 50 to about 60 feet in length, with corresponding volume capacities varying from about 4,500 cubic feet to about 7,000 cubic feet. Further, the weight capacities of such railcars typically vary from about 62 tons to about 100 tons. Laws driven by safety concerns set the maximum load allowable for a railcar. A typical maximum is about 100 tons. The ability of the auger device and method provided to pack and compress bulk materials into a railcar allows a transporter/user to increase railcar capacity for a given material and maximize use of space to lower shipping costs per cubic foot of material shipped. In an embodiment, the device and method provided pack a railcar with at least about 62 tons of bulk materials. In another embodiment, the device and method provided pack a railcar with at least about 75 tons of bulk materials. In another embodiment, the device and method provided pack a railcar with at least about 90 tons of bulk materials. In another embodiment, the device and method provided pack a railcar with at least about 95 tons of bulk materials. The device and method provided may pack more tonnage of materials into a railcar than is permitted by law.

Bulk materials may take many forms. In general, the bulk materials provided herein are compressible to one degree or another. The compressibility of the material affects how much the density of the material may be increased as it is packed in a railcar as described herein, and the potential increase in carrying capacity of a railcar. For example, the increase in density of bulk trash upon compression may be significantly greater than the increase in density of cotton seed upon compression. In an embodiment, the bulk materials provided include any bulk, dry or semi-dry, compressible material. In another embodiment, the bulk materials provided include agricultural materials. In another embodiment, the bulk materials provided include industrial and/or building materials. In another embodiment, the bulk materials provided are selected from the group consisting of cotton seed, cotton seed hulls, bulk trash, hay, straw, soybean hulls, rice hulls, mulch, cotton byproducts, cotton lint, cotton gin trash, or combinations or derivatives thereof. In another embodiment, the bulk material provided is cotton seed.

One factor in considering the potential increase in carrying capacity of a railcar is the compressibility of the bulk material to be packed. Additional checks on potential capacity increases via the methods provided herein include laws that set maximum weight capacities for railcars, and limitations on a railcar's ability to withstand the physical stresses associated with maximizing the amount of material packed/stuffed into the railcar. The type of material involved determines its compressibility and the potential increase in density of the materials inside the railcar. The increase in density in the railcar permits more tonnage of materials to be loaded into the railcar per available cubic foot, which increases railcar carrying capacity. In an embodiment, the device and method provided increase railcar capacity from about 0 to about 100 weight percent. In another embodiment, railcar capacity is increased from about 10 to about 50 weight percent. In another embodiment, railcar capacity is increased from about 15 to about 30 weight percent. In another embodiment, the bulk material provided is cotton seed and the packed density of the cotton seed inside the loaded railcar is at least about 25 pounds per cubic foot. In another embodiment, the bulk material provided is cotton seed and the packed density of the cotton seed inside the loaded railcar is at least about 30 pounds per cubic foot.

Referring again to the embodiment illustrated by FIG. 5, bulk materials packed and compressed in a railcar 115 may tend to escape or leak through any available opening. Such a leak may occur, for example, through the railcar door 112 around the assembly 110 as the assembly 110 sits inside the railcar 115. Also, as the assembly 110 is removed from the railcar 115 after packing, materials may tend to escape through the railcar door 112. Thus, in an embodiment of the device and method provided, a seal is created between the assembly 110 and the railcar door 112 as the assembly 110 sits inside the railcar 115 and transfers and packs materials into the railcar 115. In another embodiment, a barrier is placed across the entire door 112 of the railcar 115 as the assembly 110 is extracted from the packed railcar 115 in order to prevent loss of bulk materials through the doorway. In another embodiment, such a barrier placed across the entire door 112 becomes a part of the loaded railcar on the inside of the railcar door. In another embodiment, the barrier is Coopering.

Figure 6:
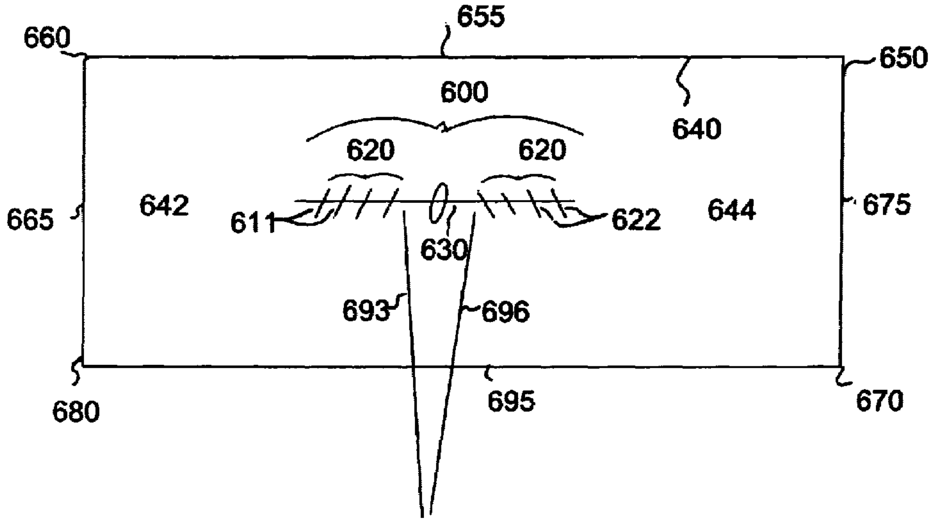
FIG. 6 illustrates a top view of an embodiment of an apparatus for increasing railcar capacity including a left-hand auger, a right-hand auger, and a common shaft.

In an embodiment illustrated by a top view in FIG. 6, an apparatus 600 is provided for conveying and packing bulk materials that includes a left-hand auger 610 and a right-hand auger 620. The left-hand auger and right-hand auger share a common shaft 630. Although in the embodiments described herein the apparatus 600 is positioned inside a railcar 640, the apparatus 600 may pack bulk materials into other types of containers in a similar manner. The apparatus 600 is positioned in the railcar 640 such that as materials are fed to the apparatus and the common shaft 630 rotates, the left-hand auger 610 packs one half 642 of the container and the right-hand auger 620 packs the other half 644 of the container.

Both the left-hand auger 610 and right-hand auger 620 are designed such that they not only convey, but also pack bulk materials into the railcar 640. As the railcar 640 fills with materials, the augers 610, 620 continue to pack bulk materials into the railcar 640. For compressible materials, such as the bulk materials provided herein, the continuous packing forces more and more material into a confined space such that the materials are pressed together, or compressed, and the density of the materials increases in the railcar 640.

Railcar or container integrity may be a consideration as methods to increase railcar capacity seek to pack, stuff, and compress more materials into railcars, which may increase the forces and stresses the walls of the railcar must withstand. The stresses of concern may be both overall and/or local stresses. In particular, local stresses may arise in the part of the railcar 640 wall towards which the left-hand 610 or right-hand 620 auger is directed, which may be the direction the bulk materials are pushed as the railcar 640 is packed. In an embodiment, the angle of the flights 621 of the right-hand auger 620 may be set such that a substantial portion of the compressive forces arising from packing bulk materials into the railcar 640 are directed towards the back, right corner 650 of the railcar 640. Similarly, the angle of the flights 611 of the left-hand auger 610 may be set such that a substantial portion of the compressive forces arising from packing bulk materials into the railcar 640 are directed towards the back, left corner 660 of the railcar 640. In another embodiment, the angles of the left- and right-hand auger flights 611, 621 may be set such that a substantial portion of the compressive forces arising from packing bulk materials are directed towards the opposite corners 670, 680 of the railcar 640. In an embodiment of the railcar 640 described herein, the corners 650, 660, 670, 680 are better able than the sides 655, 665, 675, 685 to withstand the localized stresses applied by the apparatus 600 as it packs and compresses bulk materials. In an embodiment, the augers 610, 620 may each be used on either side of the apparatus 600, as long as opposite hand augers are on each end of the apparatus 600. Swapping the augers such that the auger 610 transfers materials to the right side 644 of the railcar 640 and the other auger 620 transfers materials to the left side 642 of the railcar may change the corners towards which the forces of compression from the augers 610, 620 are directed. In one arrangement, the augers direct forces of compression towards the back corners 650, 660 of the railcar 640, and in the opposite arrangement, the augers direct such forces towards the front corners 670, 680 of the railcar 640. In yet another embodiment, more than one apparatus 600 may be positioned in the railcar 640 such that compression augers direct compressive forces towards all for corners 650, 660, 670, 680 of the railcar 640 simultaneously, while each apparatus 600 may be operated as described herein to offset destabilizing forces.

The common shaft 630 shared by the left- 610 and right-hand 620 augers is designed to stabilize the apparatus 600 by offsetting a substantial portion of the forces on the apparatus 600 arising from compression of materials packed into the railcar 640. The augers 610, 620 compress materials in the railcar in order to maximize the capacity of the railcar. The force applied by the augers 610, 620 in order to achieve the necessary increase in density of materials causes forces to be applied to the apparatus 600 and any further equipment inside the railcar 640 that may be supporting the apparatus 600. The pitch and angle of the auger flights 611, 621 are designed to direct any potentially destabilizing forces applied to the apparatus primarily along the common shaft in order that such forces may act equally in opposition and cancel out one another. Without such a stabilizing design, forces on the apparatus 600 resulting from packing the railcar 640 may push the apparatus 600 out of its proper position. In addition, in order to maintain equilibrium and the position of the apparatus 600 in the railcar, the packing of the railcar 640 must be executed such that the compressive forces on the apparatus 600 and any supporting equipment must be substantially equal and opposite on both the left-hand auger 610 side of the apparatus and the right-hand auger 620 side of the apparatus.

Another factor that may impact the stability of the apparatus 600 is the timing of the left-hand 610 and right-hand 620 augers. In an embodiment, the timing of the left-hand auger 610 and right-hand auger 620 is the same. In another embodiment, the end of the last flight of the left-hand auger 610 is in the same relative position, e.g., exactly vertical, as the end of the last flight of the right-hand auger 620. For example, when the right- and left-hand augers are mounted on the shaft, if the position of the last flight of the left-hand auger 610 is exactly vertical, then the position of the last flight of the right-hand auger 620 must be exactly vertical. Otherwise, the forces generated by the augers 610, 620 as they pack and compress materials into the railcar 640 will cause the apparatus 600 to become unstable. The stabilizing design of the apparatus 600, common shaft 630, and process of packing the railcar 640 allow employment of greater compressive forces in packing the railcar 640 and, therefore, greater railcar carrying capacity. In addition, the design alleviates the need to anchor the apparatus 600 inside the railcar 640, and alleviates the cost of employing alternative stabilizing techniques.

Also shown in the embodiment illustrated by FIG. 6 are a left feed 693 and a right feed 695. In an embodiment, the left feed 693 supplies bulk materials to the left-hand auger 610 and the right feed 695 supplies bulk materials to the right-hand auger 620. In another embodiment, the feeds 693, 695 are feed augers. When packing bulk materials into a railcar 640 via the apparatus 600 provided, the forces of compression on each end of the apparatus 600 are typically balanced in order to keep the apparatus 600 stable and maintain the position of the apparatus 600 in the railcar. The forces on each end of the apparatus 600 may be at least partially dependent on the amount of material packed into each end 642, 644 of the railcar 640. In an embodiment, the quantity of material packed into each end 642, 644 of the railcar 640 is balanced in order to maintain the equilibrium of the apparatus 600. The quantity of materials in each end 642, 644 may be controlled by the amount of materials conveyed by the feeds 693, 695 to each auger 610, 620. In an embodiment, the supply of materials to the apparatus 600 by the left feed 693 and right feed 695 is controlled such that forces on the apparatus 600 resulting from compression of materials into each end 642, 644 of the railcar 640 are balanced, thus maintaining the position of the apparatus 600 as the railcar 640 is loaded. In another embodiment, the left feed 693 and right feed 695 may be controlled independently of each other. As an example of the need to control each feed 693, 695 independently of the other, it is possible that due to unavoidable process variances the left end 642 of the railcar 640 is packed more quickly than the right end 644. As materials are packed more and more tightly into the left end 642 of the railcar 640 relative to the right end 644, greater forces will be put on the left-hand auger 610 side of the apparatus 600. The greater forces on the left-hand auger 610 side of apparatus 600 will tend to push the apparatus 600 towards the right end 644 of the railcar 640. In such a case, unbalanced forces on the apparatus may be rebalanced by stopping the supply of materials to the left-hand auger 610 via the left feed 693 while continuing to supply materials to the right-hand auger 620 via the right feed 695. Thus, in this example, as the right feed 695 is operated while the left feed 693 is shut down, the amount of material in the right end 644 of the railcar 640 may become equal with the amount of material in the left end 642, forces on the right-hand auger 620 begin to equal the forces on the left-hand auger 610, and the apparatus 600 regains stability. In this way the apparatus 600 may be designed and operated to balance opposing forces on the apparatus 600 during loading of the railcar 640, thus maintaining the position of the apparatus 600 without anchoring inside the railcar 640.

Figure 7:
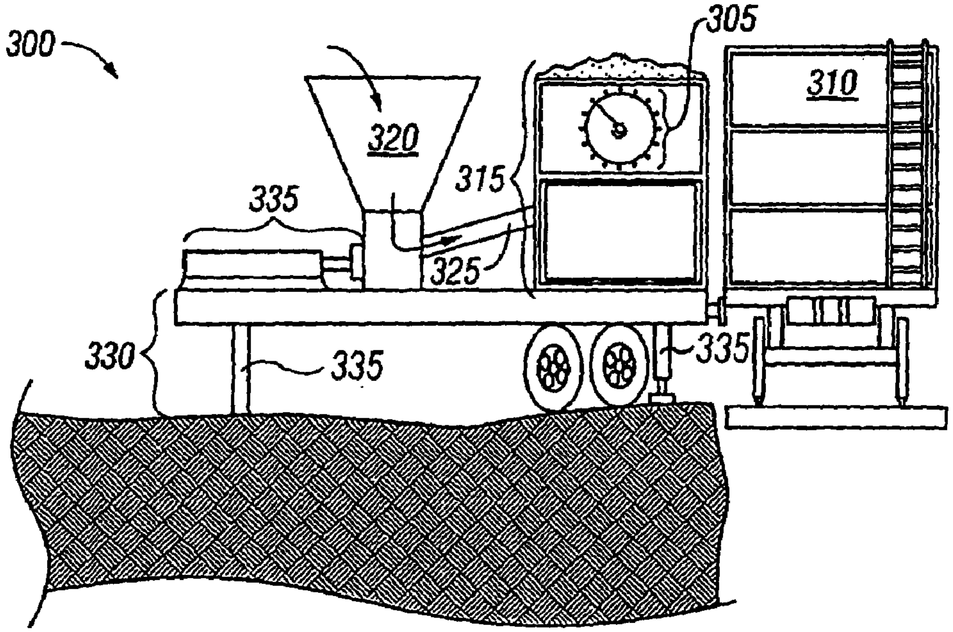
FIG. 7 illustrates a side view of an embodiment of a system for increasing railcar capacity including augers, feeds, receptacles, and a base.

FIG. 7 illustrates a side view of an embodiment of a system 300 for increasing railcar capacity by employing one or more augers 305 to transfer and pack materials into a railcar 310. In an embodiment, the system 300 includes two compression augers 305 as described herein, such that when the auger assembly 315 is moved into the railcar 310, one auger transfers materials to one end of the railcar 310 and the other auger transfers materials to the other end of the railcar 310. The system 300 also includes one or more receptacles 320 that receive bulk materials and make the bulk materials available to one or more feeds 325. In an embodiment, the system 300 includes one receptacle 320 and two feeds 325, each feed supplying bulk materials to a different compression auger 305. The feeds 325 convey materials to the augers 305. The embodiment illustrated by FIG. 7 also includes a base 330 and a mechanism 335 for moving the assembly 315 into and out of the railcar 310.

The receptacle 320 is where bulk materials are loaded so that they may be transferred into the railcar 310. In an embodiment, the receptacle 320 is a hopper. Typically, gravity moves materials through the receptacle to the one or more feeds 325. The receptacle 320 may act as a funnel such that it is wider at the end where the materials are loaded and narrower at the end where the materials are moved by gravity to the feeds 325. The receptacle 320 may be filled and refilled as gravity continuously makes materials available to the feeds 325 such that the system 300 may operate continuously.

The system 300 may include a base 330. In an embodiment, the hopper 320, feeds 325, and assembly 315 are skid-mounted on the base 330. In another embodiment, only the assembly 315 is skid-mounted on the base 330. In another embodiment, the hopper 320, feeds 325, and assembly 315 are wheel-mounted. In another embodiment, only the assembly 315, including the auger 305 and feed 325, is wheel-mounted. Skid-mounting may promote movement of system 300 components in order to insert the assembly 315 into the railcar 310. In an embodiment, the base includes landing gear 335 designed to anchor and steady the base 330 and other system 300 components as a railcar 310 is loaded. The forces required to pack and compress materials into a railcar 310 may cause reaction forces to push on the assembly 315, which may affect stability of the system 300. Landing gear 335 accounts for the effects of such forces. In an embodiment, the base 330 is a mobile base. A mobile base 330 may make it possible to transport the system 300 from one loading site to another. In addition, the mobile base 330 may make it more convenient to position the system 300 correctly for moving the assembly 315 into the railcar 310. In an embodiment, the mobile base 330 is a trailer that may be pulled behind a vehicle. In another embodiment, the mobile base 330 includes landing gear 335 that anchors and stabilizes the system 300 once it is positioned for loading a railcar 310. The landing gear 335 is also designed to anchor and steady the system 300 in a fixed position as the system 300 loads the railcar and any forces resulting from compression are directed on the assembly 315.

The system 300 provided may also include a mechanism 335 for moving the assembly 315 into and out of a railcar 310. The mechanism 335 may be attached to the base 330. In an embodiment, the mechanism 335 moves the receptacle 320, feeds 325, and assembly 315 in order to position the assembly 315 inside the railcar 310. In another embodiment, the mechanism 335 moves only the assembly 315 in order to position the assembly 315 inside the railcar 310. The mechanism 335 may be any means for moving the assembly 315 inside the railcar 310 and into position for loading. In an embodiment, the mechanism 335 is hydraulically driven. In another embodiment, the mechanism 335 is mechanically driven. Once the system 300 is position along-side a railcar 310 and appropriate measures are taken to ensure the assembly 315 and railcar 310 door are at compatible heights, the mechanism 335 may be engaged to push the assembly 315 inside the railcar 310 and into position for transferring bulk materials into the railcar 310. Once the railcar 310 is packed, the mechanism 335 may either partially or entirely extract the assembly 315 from the railcar 310 and back to the assembly's 315 starting position.

Figure 8:
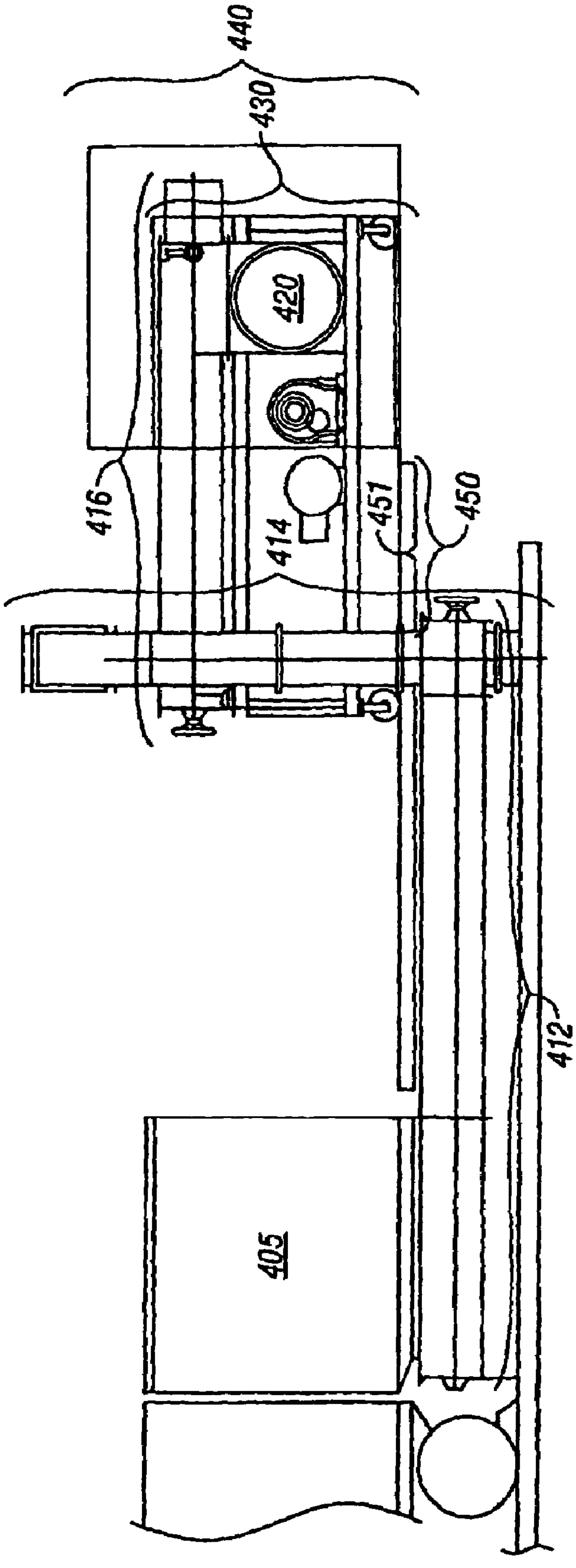
FIG. 8 illustrates a side view of an embodiment of a system for increasing railcar capacity including feeds that may transfer and pack bulk materials.

FIG. 8 illustrates a side view of an embodiment of a device 400 for increasing railcar capacity as provided herein. The embodiment of FIG. 8 includes one or more feeds 416 that supply bulk materials to one or more augers 420. An assembly 430, including the one or more feeds 416 and one or more augers 420, is shown inserted into a railcar 440. The one or more feeds 416 in this embodiment are positioned to carry bulk materials above the one or more augers 420. In an embodiment, the device 400 is designed such that bulk materials are supplied by the one or more feeds 416 to an opening between the one or more feeds 416 and the one or more augers 420. The bulk materials may move through the opening to the one or more augers 420, which transfer materials into the railcar 440. In an embodiment, the one or more feeds 416 are feed or screw augers. In another embodiment, the one or more feeds 416 are compression augers. In another embodiment, the one or more feeds 416 are feed belts. In another embodiment, the one or more feeds 416 are feed drags. In another embodiment, the one or more feeds 416 are feed augers and are capable of transferring bulk materials into the railcar 440 independent of said one or more augers 420. In another embodiment, an opening between one or more feed augers 416 and one or more augers 420 is closed such that bulk materials bypass the one or more augers 420 and are transferred into the railcar 440 by the one or more feed augers 416.

In the embodiment illustrated by FIG. 8, the assembly 430 may be inserted in the railcar 440 in order to pack the railcar 440 with bulk materials. Bulk materials are loaded in the receptacle 405 and made available to a first feed auger 412. The first feed auger 412 transfers the materials so that they are available to a second auger 414, which transfers the materials vertically to a third feed auger 416. Once the assembly 430 is fully inserted into the railcar 440, the feed augers 412, 414, 416 may be engaged to supply materials from the receptacle 405 to an opening between the third feed auger 416 and the auger 420. The materials move through the opening and are transferred into the railcar 440 by the auger 420. In this embodiment, both the third feed auger 416 and auger 420 are compression augers. As the available space in the railcar 440 not occupied by the assembly 430 becomes full, the compression auger 420 continues to press and pack materials into the railcar 440 such that material density increases. Once a desired material density is reached, the assembly 430 may be wholly or partially withdrawn from the railcar 440, thus creating open space within the railcar 440 where the assembly 430 had been positioned. If the assembly 430 is only partially withdrawn from the railcar 440, the compression feed auger 416 may be employed to fill the open space previously occupied by the assembly 430. In an embodiment, the assembly 430 is partially removed from the railcar 440, the supply of materials from the receptacle 405 to the assembly 430 is stopped, an opening between the compression feed auger 416 and compression auger 420 is closed, an opening at the railcar-end of the compression feed auger 416 is opened, and the supply of materials from the receptacle 405 to the assembly 430 is resumed. The resumed supply of bulk materials is conveyed to the compression feed auger 416 and bypasses the compression auger 420. The compression feed auger 416 transfers the material through the opening at the railcar-end of the compression feed auger 416 to the open space in the railcar 440 previously occupied by the assembly 430. Thus, the compression feed auger 416 may be employed to more thoroughly pack the railcar 440 with materials.

Also shown in the embodiment illustrated by FIG. 8 is a vertically pivoting ramp 450 that promotes movement of the assembly 430 into and out of the railcar 440. The level of the railcar 440 and railcar 440 door through which the assembly 430 is inserted may move vertically depending on the load in the railcar 440. Thus, the ramp 450 may be laid between the device 400 and railcar 440 door in order to account for discrepancies between the height of the device 440 and height of the railcar 440 door and promote insertion of the assembly 430 into the railcar 440. In an embodiment, the ramp 450 includes a pivot point 451 about which the ramp may pivot in order to account for changes in relative height between the device 400 and railcar 440 door.

While the present invention has been illustrated and described in terms of particular apparatus and methods of use, it is apparent that equivalent techniques and components may be substituted for those shown, and other changes can be made within the scope of the present invention as defined by the appended claims.

The particular embodiments disclosed herein are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What I claim as my invention is:

1. In a system for loading a railcar comprising a railcar, an apparatus for loading and compressing bulk material into a railcar, comprising:

a movable frame adapted to move into and out of the railcar;

one or more compression augers mounted on the movable frame and movable therewith;

one or more conveyors for feeding the bulk material to the one or more augers carried by the mobile frame; and wherein the compression augers are operative to receive bulk material from the one or more conveyers and to transfer bulk material into the railcar and to compress the bulk material therein.

2. The apparatus of claim 1 wherein the apparatus is provided with at least two compression augers.

3. The apparatus of claim 2 wherein the two compression augers are longitudinally aligned, and include flights that are oriented with respect to each other such that bulk material is conveyed outwardly in opposite directions from the apparatus.

4. The apparatus of claim 3 wherein each auger is mounted on a common shaft.

5. The apparatus of claim 2 including a railcar having an access opening formed therein and wherein the mobile frame having the one or more augers mounted thereon is operative to move in and out of the access opening of the railcar.

6. The apparatus of claim 1 wherein the one or more augers include a pitch and wherein the ratio of the pitch of the auger to auger diameter is from about 0.05 to about 0.5.

7. The apparatus of claim 6 wherein the ratio of the auger pitch to the auger diameter is about 0.1 to about 0.3.

8. The apparatus of claim 1 wherein the one or more augers include flights and wherein there is provided cuts formed in one or more of the flights.

9. The apparatus of claim 8 wherein the flights include at least one end flight without a cut formed therein.

10. The apparatus of claim 2 wherein the augers are driven by a common shaft.

11. The apparatus of claim 1 including a hopper and wherein the one or more conveyors extend between the hopper and the one or more compression augers.

12. The apparatus of claim 1 wherein the one or more conveyors for feeding bulk material to the one or more augers includes a conveyor that is operative to fill a void in the railcar caused by the movable frame being removed from the railcar.

* * * * *